(12) United States Patent
Williams, Jr.

(10) Patent No.: US 6,793,108 B2
(45) Date of Patent: Sep. 21, 2004

(54) PIVOTING ASSEMBLY FOR HOLDING A GUN OR A BOW

(76) Inventor: Ambers F. Williams, Jr., 700 Hedgemont Ave., Fayetteville, TN (US) 37334

( * ) Notice: Subject to any disclaimer, the term of this patent is extended or adjusted under 35 U.S.C. 154(b) by 236 days.

(21) Appl. No.: 09/938,965

(22) Filed: Aug. 24, 2001

(65) Prior Publication Data

US 2003/0038150 A1 Feb. 27, 2003

(51) Int. Cl.$^7$ ................................................. B60R 9/00
(52) U.S. Cl. ...................... 224/401; 224/410; 224/558; 224/570; 224/913; 248/288.31
(58) Field of Search ................................. 224/913, 558, 224/567, 570, 448, 282, 401, 408, 410, 412, 419; 248/229.14, 316.4, 481, 482, 181.1, 229.12, 231.71, 228.31, 229.15, 276.1; 42/94; 211/64

(56) References Cited

U.S. PATENT DOCUMENTS

| | | | | |
|---|---|---|---|---|
| 2,605,069 A | * | 7/1952 | Gillaspy | ..................... 248/103 |
| 2,861,501 A | * | 11/1958 | Strelakos | .................. 248/276.1 |
| 2,950,836 A | * | 8/1960 | Murdock | .................. 248/181.1 |
| 3,424,419 A | * | 1/1969 | Siegel | .................... 248/288.31 |
| 3,428,286 A | * | 2/1969 | Del Pesco | .................. 248/481 |
| 4,159,092 A | * | 6/1979 | DeLano | ................... 248/276.1 |
| 4,735,388 A | * | 4/1988 | Marks | ......................... 248/103 |
| 4,823,673 A | * | 4/1989 | Downing | .................... 224/448 |
| 5,360,018 A | * | 11/1994 | Chen | .......................... 128/849 |
| 5,664,750 A | * | 9/1997 | Cohen | ................... 248/288.31 |
| 5,697,181 A | * | 12/1997 | Savant | ....................... 224/913 |
| 5,876,005 A | * | 3/1999 | Vasconi | ................... 248/276.1 |
| 5,878,929 A | * | 3/1999 | Leonard | ...................... 224/913 |
| 5,979,099 A | * | 11/1999 | Kervin | ......................... 42/94 |
| 6,042,080 A | * | 3/2000 | Shepherd et al. | .............. 42/94 |
| 6,238,270 B1 | * | 5/2001 | Robinson | ...................... 451/41 |
| 6,286,797 B1 | * | 9/2001 | Thaxton | ................ 248/229.14 |
| 6,484,913 B1 | * | 11/2002 | Hancock et al. | ............ 224/448 |

* cited by examiner

Primary Examiner—Nathan J. Newhouse
(74) Attorney, Agent, or Firm—Curtis W. Dodd

(57) ABSTRACT

An apparatus for holding a gun or a bow securely to an all terrain vehicle. The apparatus has one or more adjustable support arms each having a quick release and lock mechanism. The support arms serve as a way to allow the gun or bow to fit closely to the contour of the vehicle.

10 Claims, 4 Drawing Sheets

PIVOTING ASSEMBLY FOR HOLDING A GUN OR A BOW

FIELD OF THE INVENTION

The present invention relates to attaching an adjustable mounting assembly to an All Terrain Vehicle ("ATV") where the mounting assembly may hold a gun or a bow. The mounting assembly allows the gun or bow to fit closely to the contour of the ATV thereby providing a profile suitable for traveling in an area with dense undergrowth or extending objects that could damage the gun or bow.

BACKGROUND OF THE INVENTION

All terrain vehicles (ATVs) have become a popular and useful means for transportation in areas not suitable for cars, trucks and other vehicles. Sportsmen, hunters, and others use ATVs for carrying camping, hunting, or other equipment. Because ATVs are not suitable for attachment of a standard gun rack or other conventional hunting equipment brackets there is a need for providing a way for hunters and sportsmen to mount and secure their weapons of choice, gun or bow, to ATVs (also known as "four wheelers"). Although ATVs normally provide accessory packages which include rack extension kits or "baskets", the user is typically left with the problem of securing guns, bows and various shaped devices securely to the ATV in a way that reduces the chance of the user's hunting equipment from falling or being knocked loose. This is especially important when an ATV travels on rough terrain having dense undergrowth, vegetation or other obstacles that may knock equipment loose or damage equipment. Hence ATV transported hunting equipment should be mounted securely and fit closely to the contour of the ATV.

The pivoting assembly of the present invention provides several degrees of rotational freedom for adjustment not available on existing or traditional mounting assemblies and provides a means for holding the transported weapon closely against the ATV which reduces the chance of damaging or knocking the transported weapon from a weapon mount or bracket. Hence an apparatus, the pivoting assembly, is provided that meets the needs of hunters and that is not available in any prior art apparatus known to the inventor.

Existing or conventional gun holders with mounting kits provide a way of attaching conventional holders to the rear deck plates of an ATV. The problem is that such kits are designed to be rigidly mounted and do not allow the user to adjust the profile or position to meet the needs of a particular situation. Additionally, there are a number of "home-made" mounts that have been designed by individuals who are not satisfied with existing mounting kits. There are no mounting kits that allow the user to significantly adjust a mount attached to an ATV. Hence there is a need for an adjustable gun or bow holder, ATV mountable, that may be adapted to hold the gun or bow in positions that reduces the chances of contact with brush, trees, and other objects. If such a mount had several adjustments, easily made in the field, the mount would allow hunters or other users to quickly adjust the mount to a position or orientation which best meets their current requirements. The present invention would further meet the needs of a user if the improved mount or mounting apparatus was easy to manufacture and was available at the reasonable price.

BRIEF DESCRIPTION OF THE DRAWINGS

Several figures are provided to illustrate the pivoting assembly in accordance with the present invention.

DESCRIPTION OF THE PREFERRED EMBODIMENTS

Figure 1:
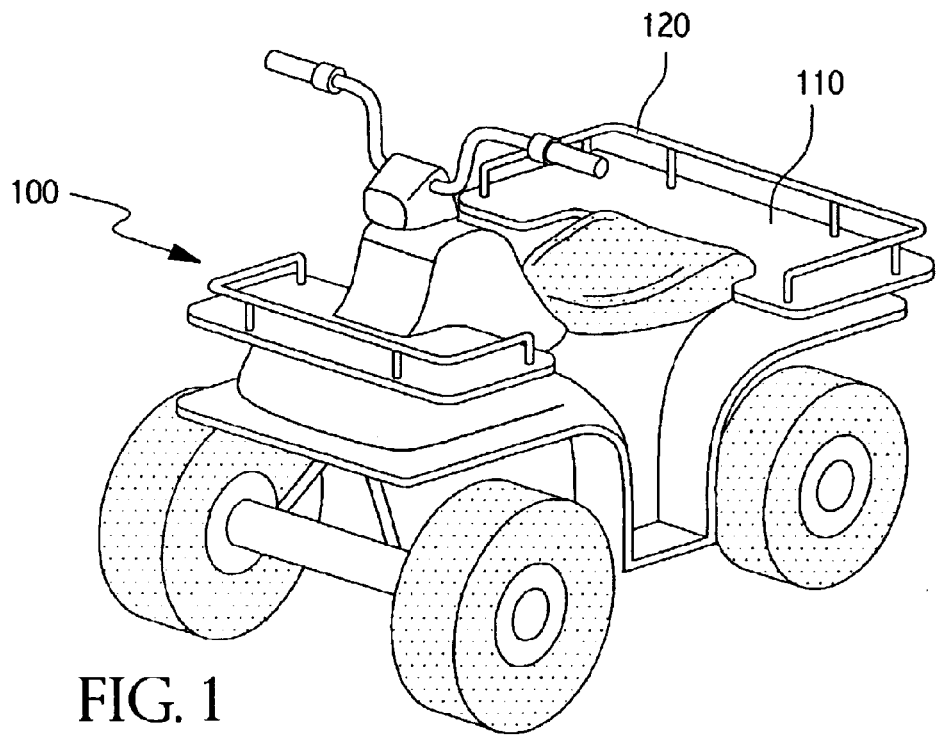
FIG. 1 illustrates an all terrain vehicle with a rear deck and rack extension kit having the pivoting assembly of the present invention attached to tubes of the rack extension kit.
Figure 2:
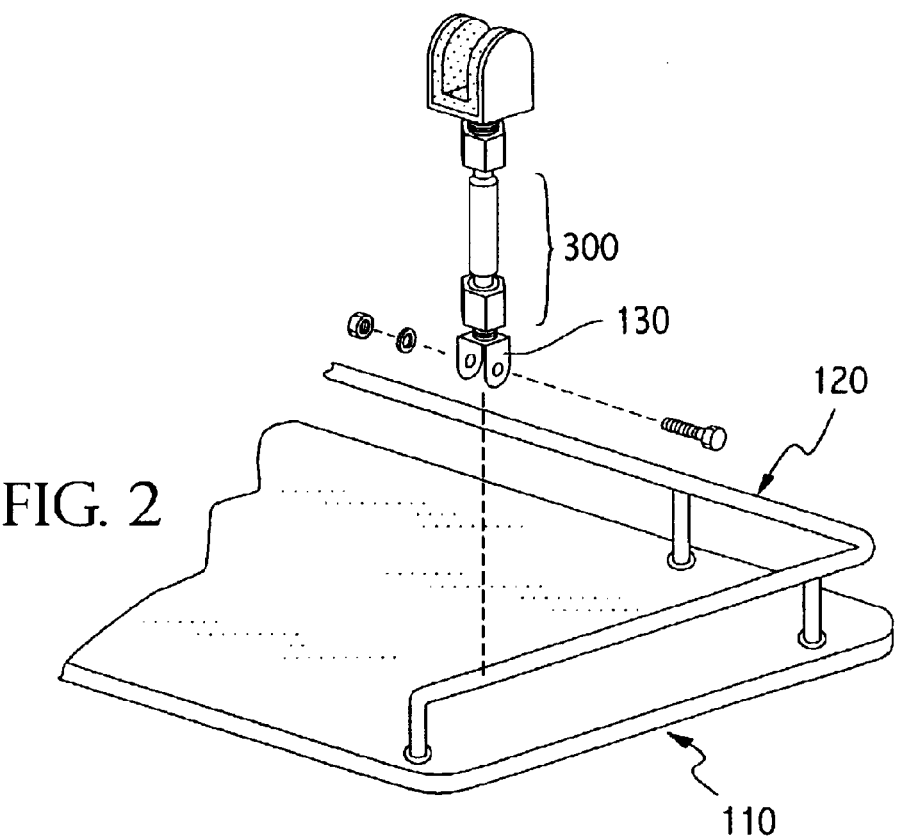
FIG. 2 illustrates the rear deck plate with clamps for securing the pivoting assembly in accordance with present invention.

Referring to FIG. 1 there is shown an ATV 100 or four wheeler having a rear deck plate 110. Attached to the deck plate is a rack extension kit 120 which may be purchased from the ATV manufacturer or other sources. The rack extension kit makes a "U" shape as shown and is coupled securely to the rear deck plate of the ATV. The rack extension kit 120 is typically metal tubing that may have a round shape or square shape. The tubing provides attachment places or points for tie-down straps, gun mount assemblies, bow mount assemblies, or other similar equipment. It is understood that neither the shape of the tubing, the arrangement of the tubing nor the material used for the tubing is a limitation on the present invention. A clamp 130, shown in FIG. 2, is used to couple or secure the pivoting or swivel assembly 300 to the tubes 120 of the rack extension kit. Details of the clamp are illustrated more clearly in FIGS. 3 and 4.

Figure 3:
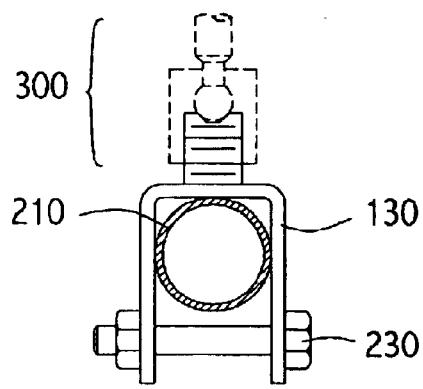
FIG. 3 illustrates an attachment clamp for a round tube in accordance with the present invention.
Figure 4:
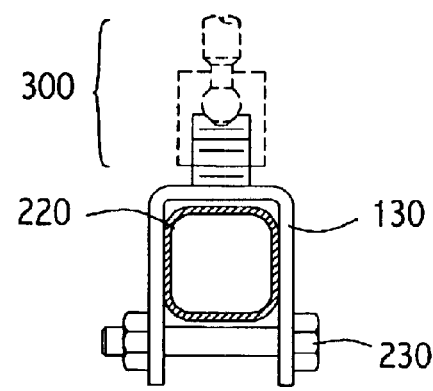
FIG. 4 illustrates an attachment clamp for a square tube in accordance with the present invention.
Figure 5:
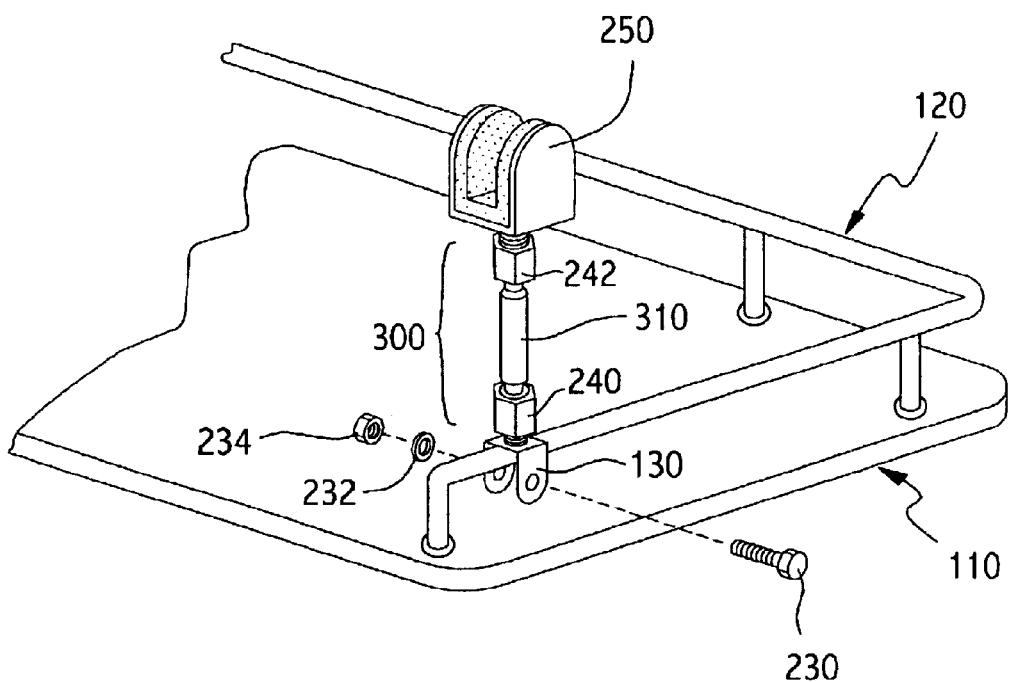
FIG. 5 illustrates a pivoting assembly mounted to a side tube of the rack extension kit tube in accordance with present invention.

Referring now to FIG. 3 there is shown the clamp 130 securely fastening the pivoting assembly to a round tube 210. FIG. 4 shows the clamp 130 securely fastening the pivoting assembly to a square tube 220. The clamp is forced against either of the tubes 210, 220 providing a secure connection, with a bolt 230, a washer 232 and a nut 234 as shown in FIG. 5. The shape of the clamp is not a limitation on the present invention. Further those skilled in the art could provide a variety of other well-known attachment means to secure the pivoting assembly to the rear of the ATV or other vehicle. Such variations fall with in the scope the present invention.

As shown in FIG. 5, there is a mounting shaft 310, capable of swiveling or pivoting, as will be seen. Coupled to first end or mount end 242 of the mounting shaft is a mount 250 for holding a gun or a bow. At the other end or clamp end 240 of the mounting shaft is the clamp 130 for securing the pivoting assembly to the tube of the extension kit. The mount 250 is shaped, typically with a "U" shaped cross section, to hold a gun, a bow or other equipment and the mount may have a soft and resilient pad 350 to protect the gun or bow from damage. Variations in the shape of the cross section or the pad material is not a limitation on the invention. In addition shape and padding a strap, not shown, may secure the gun or bow within the mount 250. More details of the mounting shaft and coupling arrangement for the pivoting assembly is shown in FIG. 6.

Figure 6:
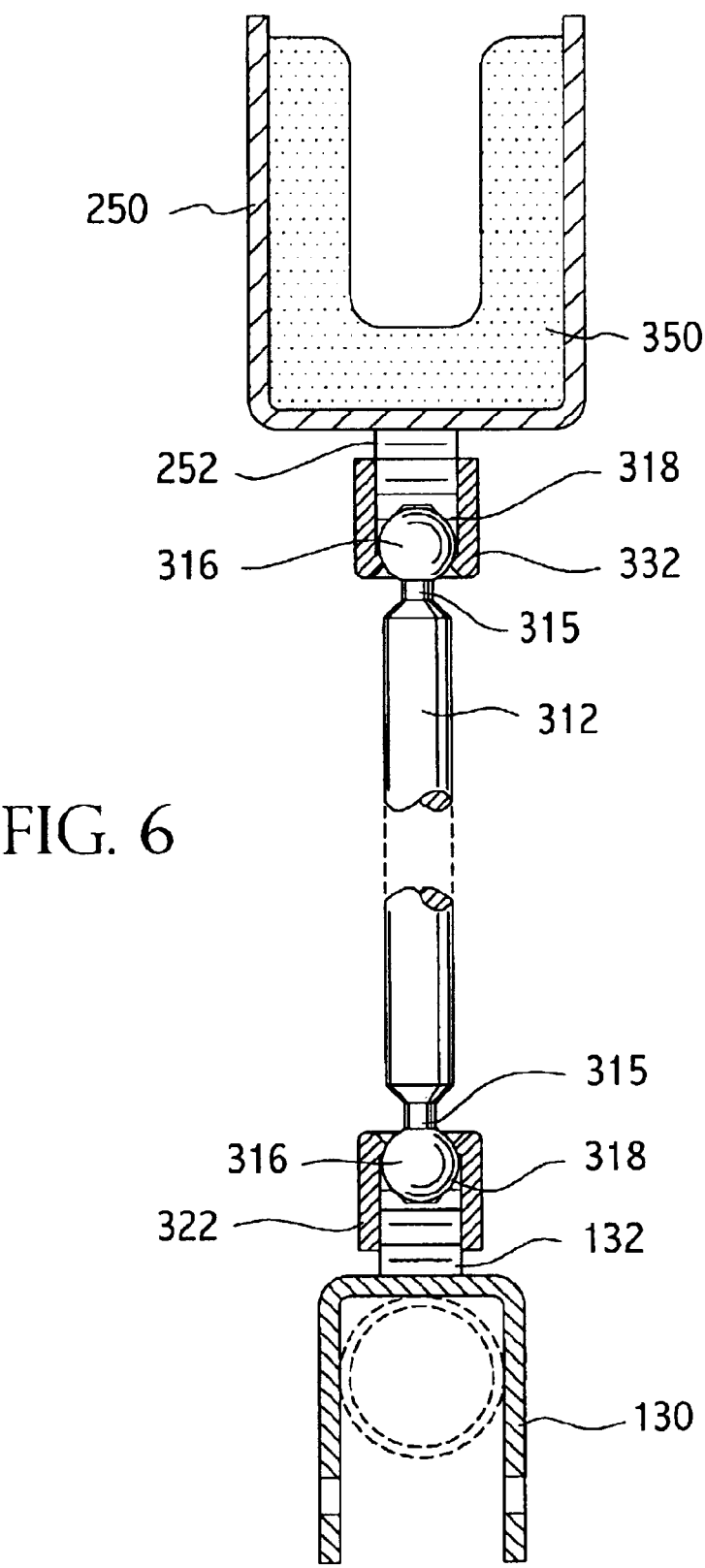
FIG. 6 illustrates details of the pivoting assembly in accordance with the present invention.

FIG. 6 shows the clamp end 240 of the mounting shaft coupled to the clamp 130 and the mount end 242 of the mounting shaft coupled to the mount in accordance with the present invention. Each end of the mounting shaft functions essentially identically, providing a swivel or pivot point, and is comprised of a ball 316, acting as a swivel, and a coupling nut 322 or 332 as shown. A first coupling nut 322 at the clamp end 240 attaches to a threaded shaft 132 that extends upward and a second coupling nut 332 at the mount end attaches to a threaded shaft 252 extending downward from the mount 250. Both of the threaded shafts 132, 252 have a ball seat 318, tapered for receiving and containing each ball 316 on the ends of the mounting shaft 312. In addition the coupling nuts are cup shaped and have a tapered hole in bottom of the cup that is smaller than the diameter of the ball. When each of the nuts is tightened each of the balls on the coupling shaft is forced into the seat and the mounting shaft 312 is held firmly and securely in a fixed position by the force of friction. When the nut is loosened the mounting shaft may be pivoted backward or forward or may be pivoted left or right or may be rotated up to 360 degrees. The pivoting motion as just described applies to the clamp side of the mounting shaft 312 and the mount side of the mounting shaft. The degrees of motion available at each end of the pivoting assembly allow the mount to be oriented in a variety or directions and further allow the mounting shaft to be oriented as desired. When the mount is oriented as desired, the nuts are tightened to lock the mounting shaft, the mount and clamp in the desired position. The degrees of freedom in orientation of the pivoting assembly of the present invention allow for an orientation to minimize the chance of hitting undergrowth or other objects near the ATV. Those skilled in the art would appreciated pivoting apparatus of the present invention could be used to mount equipment on other vehicles operating in similar environments.

Those skilled in the art would appreciate that the pivot balls cannot be attached to the mount shaft until the coupling nuts are positioned on the tapered ends of the mounting shaft. The pivot balls may be securely attached to the mounting shaft by spot welding, or by a press fit, or by variety of methods know to those skilled in the art. Neither the method of fabrication nor the shape and length of the mounting shaft are considered a limitation of the present invention.

Figure 9:
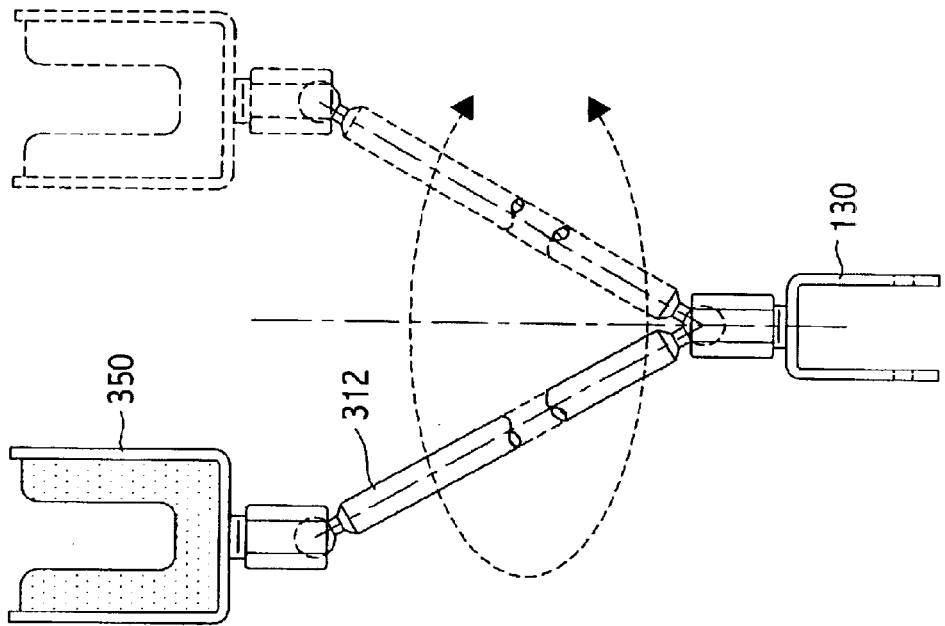
FIGS. 7, 8 and 9 illustrate several of the positions available for the pivot assembly in accordance with the present invention.
Figure 8:
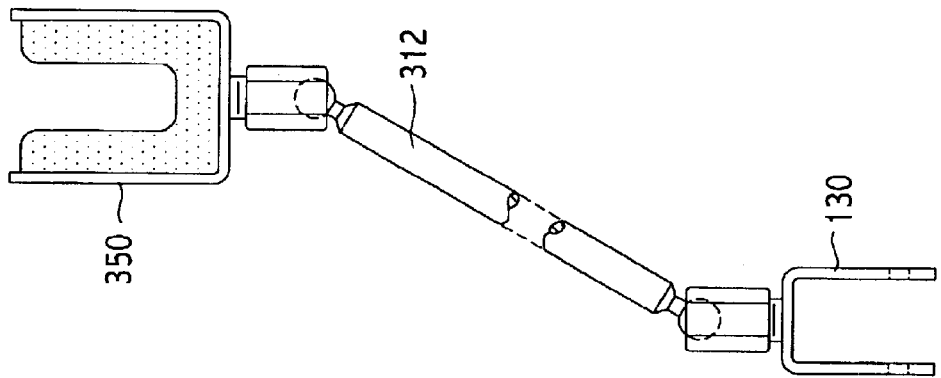
Figure 7:
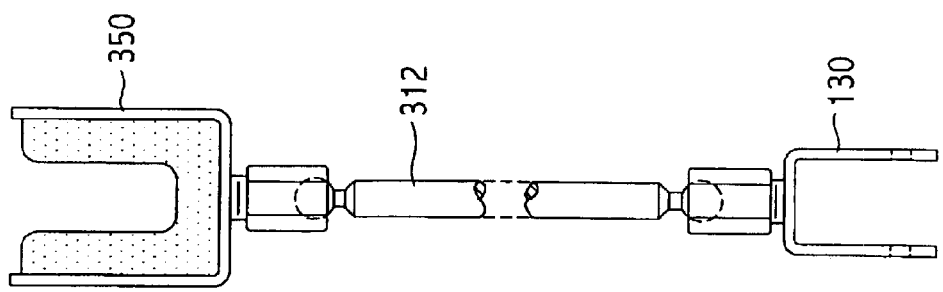

FIGS. 7, 8, and 9 illustrate, as nonlimiting examples, a variety of positions available for the pivoting assembly of the present invention. When using the present invention two pivoting assemblies are typically used to mount a bow or a gun. One of the pivoting assemblies may be used to hold other, typically smaller, equipment.

From the foregoing, it will be observed that numerous variations and modifications may be effected without departing from the spirit and scope of the novel concept of the invention. It is to be understood that no limitation with respect to the specific apparatus illustrated herein is intended or should be inferred. It is, of course, intended to cover by the appended claims all such modifications as fall within the scope of the claims.

What is claimed is:

1. A pivoting assembly for holding hunting equipment to a bar on an all terrain vehicle (ATV), the assembly comprising:
   a first threaded shaft with a ball seat, the first threaded shaft attached to and extending upward from a clamp wherein the clamp is U-shaped and is secured to the bar with a bolt and nut;
   a second threaded shaft with a ball seat, the second threaded shaft attached to and extending downward from U-shaped hunting equipment mount at the center of the U-shaped mount; and
   a shaft having a pivot ball and attachment nut on each end, the attachment nuts adapted to secure the ball in the ball seat of each of the threaded shafts.

2. The assembly of claim 1 wherein the U-shaped hunting equipment mount is lined with a soft and resilient material.

3. The assembly of claim 1 wherein the U-shaped hunting equipment mount is a gun mount.

4. The assembly of claim 1 wherein the U-shaped hunting equipment mount is a bow mount.

5. A pivoting assembly for positioning hunting equipment on a bar of an ATV, the pivoting assembly comprising:
   a first ball on one end of a shaft, the first ball having a first attachment nut;
   a second ball on the other end of the shaft, the second ball having a second attachment nut;
   a first threaded shaft with a seat for receiving the first ball, the first threaded shaft attached to a clamp wherein the clamp is secured to the bar with a bolt and nut; and
   a second thread shaft with a seat for receiving the second ball, the second threaded shaft being attached to a U-shaped hunting equipment mount at the center at the center of the U-shaped mount.

6. The pivoting assembly of claim 5 wherein the U-shaped hunting equipment mount is a gun mount.

7. The pivoting assembly of claim 5 wherein the U-shaped hunting equipment mount is a bow mount.

8. A pivoting assembly for holding hunting equipment in a user selected position, the assembly comprising:
   a mounting shaft with a coupling nut and ball on each end;
   a U-shaped mount with a threaded shaft at the center at the center of the U-shaped mount having a ball seat for coupling to one end of the mounting shaft and secured in position when the nut is tightened; and
   a clamp that is secured to an attachment bar with a bolt and a nut, the clamp having a threaded shaft with a ball seat for coupling to the other end of the mounting shaft.

9. The pivoting assembly of claim 8 wherein the U-shaped mount is lined with a resilient material.

10. The pivoting assembly of claim 9 wherein the U-shaped mount has a hold-down strap.

* * * * *